United States Patent
Farmer et al.

(10) Patent No.: US 9,177,009 B2
(45) Date of Patent: Nov. 3, 2015

(54) GENERATION BASED UPDATE SYSTEM

(75) Inventors: Ryan Farmer, Redmond, WA (US); Paul Tidwell, Redmond, WA (US); John Zybura, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/536,948

(22) Filed: Jun. 28, 2012

(65) Prior Publication Data
US 2014/0002504 A1 Jan. 2, 2014

(51) Int. Cl.
  *G06F 17/30* (2006.01)
  *G09G 5/00* (2006.01)
  *H04N 19/119* (2014.01)
  *H04N 19/174* (2014.01)

(52) U.S. Cl.
  CPC ............ *G06F 17/30356* (2013.01); *G09G 5/00* (2013.01); *G09G 2340/14* (2013.01); *G09G 2370/022* (2013.01); *G09G 2370/10* (2013.01); *G09G 2370/16* (2013.01); *H04N 19/119* (2014.11); *H04N 19/174* (2014.11)

(58) Field of Classification Search
  CPC .. G06F 3/1454; G06F 3/1462; G09G 2310/04
  See application file for complete search history.

(56) References Cited

U.S. PATENT DOCUMENTS

| | | | | |
|---|---|---|---|---|
| 5,263,136 | A * | 11/1993 | DeAguiar et al. | 345/538 |
| 6,982,729 | B1 * | 1/2006 | Lange et al. | 345/660 |
| 7,203,708 | B2 * | 4/2007 | Liu et al. | 1/1 |
| 7,278,117 | B2 | 10/2007 | Gargi | |
| 2004/0049737 | A1 * | 3/2004 | Simon Hunt et al. | 715/513 |
| 2005/0010916 | A1 * | 1/2005 | Hagen et al. | 717/170 |
| 2006/0050973 | A1 * | 3/2006 | Ishikawa | 382/232 |
| 2007/0276885 | A1 * | 11/2007 | Valiyaparambil et al. | 707/204 |
| 2009/0037724 | A1 * | 2/2009 | Carion et al. | 713/100 |
| 2010/0174690 | A1 * | 7/2010 | Marcotte | 707/695 |
| 2010/0268694 | A1 * | 10/2010 | Denoue et al. | 707/693 |
| 2011/0010629 | A1 * | 1/2011 | Castro et al. | 715/732 |
| 2011/0026506 | A1 * | 2/2011 | Macnaughtan et al. | 370/338 |
| 2011/0113359 | A1 * | 5/2011 | Massey et al. | 715/771 |

(Continued)

OTHER PUBLICATIONS

Vankeirsbilck, et al., "Bandwidth Optimization for Mobile Thin Client Computing through Graphical Update Caching", Retrieved at <<http://ieeexplore.ieee.org/stamp/stamp.jsp?tp=arnumber=4783355>>, Australasian Telecommunication Networks and Applications Conference, ATNAC, Dec. 7-10, 2008, pp. 385-390.

(Continued)

*Primary Examiner* — Richard Bowen
(74) *Attorney, Agent, or Firm* — Louise Bowman; Peter Taylor; Micky Minhas

(57) ABSTRACT

Techniques are directed to managing image generation for desktop and screen sharing systems as well as for large image systems such as mapping. An apparatus may comprise a logic device, a remote sharing module and an image generation module. The remote sharing module is operative on the logic device to share an image with one or more client devices. The image may be divided into a plurality of tiles each corresponding to a portion of the shared image. The image generation module is operative on the logic device to determine a version of each of the plurality of tiles and compares the version of each of the plurality of tiles with a received client version of the same image.

17 Claims, 10 Drawing Sheets

(56) References Cited

U.S. PATENT DOCUMENTS

| | | | |
|---|---|---|---|
| 2011/0208695 A1* | 8/2011 | Anand et al. | 707/610 |
| 2011/0276619 A1 | 11/2011 | Khan et al. | |
| 2011/0276900 A1 | 11/2011 | Khan et al. | |
| 2012/0001832 A1* | 1/2012 | Braghis et al. | 345/2.2 |
| 2012/0005301 A1* | 1/2012 | Braghis et al. | 709/213 |
| 2012/0191773 A1* | 7/2012 | Appleton | 709/203 |
| 2012/0221639 A1* | 8/2012 | Mallet et al. | 709/204 |
| 2012/0324358 A1* | 12/2012 | Jooste | 715/733 |
| 2013/0078598 A1* | 3/2013 | Dunne | 434/128 |
| 2013/0145407 A1* | 6/2013 | Han et al. | 725/91 |
| 2013/0218845 A1* | 8/2013 | Kleppner et al. | 707/687 |
| 2013/0332916 A1* | 12/2013 | Chinn et al. | 717/169 |

OTHER PUBLICATIONS

Shen, et al., "A High-Performanance Remote Computing Platform", Retrieved at <<http://ieeexplore.ieee.org/stamp/stamp.jsp?tp=&arnumber=4912855>>, IEEE International Conference on Pervasive Computing and Communications (PerCom), Mar. 9-13, 2009, pp. 1-6.

"Cover Story -Remote Access with VNC", Retrieved at <<http://www.linux-magazine.com/w3/issue/85/Remote_Access_with_VNC.pdf>>, Linux Magazine, No. 85, Dec. 2007, pp. 22-26.

"Administration Guide", Retrieved at <<http://www.vmware.com/pdf/viewmanager3_admin_guide.pdf>>, Retrieved Date: Dec. 21, 2011, pp. 1-182.

* cited by examiner

600

```
RECEIVING A PLURALITY OF TILES EACH HAVING A FIRST
TOTAL PIXEL SIZE
602
```

```
RESIZING EACH TILE TO A SECOND PIXEL SIZE HAVING A
SECOND PIXEL SIZE WHERE THE SECOND TOTAL PIXEL SIZE
< THE FIRST TOTAL PIXEL SIZE
604
```

COMBINING A FIRST PLURALITY OF TILES REPRESENTING
THE IMAGE TO PRODUCE A REVISED IMAGE
612

RESIZING THE REVISED IMAGE
614

DIVIDING THE REVISED IMAGE INTO A SECOND PLURALITY
OF TILES WHERE THE SECOND PLURALITY OF TILES < THE
FIRST PLURALITY OF TILES
616

RECEIVING A PLURALITY OF TILES DEFINING AN ORIGINAL IMAGE SIZE
622

RESIZING THE PLURALITY OF TILES USING THE FORMULA $1/2^N$ WHERE N IS THE PROPORTION OF THE SIZE OF THE RESIZED IMAGE AS COMPARED TO THE ORIGINAL IMAGE
624

*FIG. 6C*

GENERATION BASED UPDATE SYSTEM

BACKGROUND

Desktop or screen sharing enables participants to view data and/or applications on a remote device over a network. This allows various geographically disparate participants to view images and communicate information over a network similar to a physical face-to-face meeting. In web based screen sharing applications, the shared image is typically saved on a server. In order to effectively share large images among participants during such screen sharing sessions, these images may be divided into a plurality of tiles and saved on the web server where each tile corresponds to a portion of the image displayed on the screen to be shared. For example, if an image to be shared is displayed on a 1920×1200 pixel monitor, the image may be divided into hundreds of individual chunks or tiles where each tile corresponds to a subset of pixels representing a portion of the shared image. When a portion of the shared image is updated, the tiles corresponding to the updated portion of the image must be sent to each participant involved in the screen sharing session so that each participant is viewing a current version of the shared image.

When large amounts of a shared image are updated, each participant must send individual requests to the web server in order to receive each of the updated tiles corresponding to the updated portions of the shared image. Unfortunately, this results in high latency between image updates among the participants. In addition, existing screen sharing applications require the server to track and maintain the various states of each of the tiles that comprise the shared image on a participant by participant basis. In other words, the server must keep track of which version of the image a participant is viewing in order to determine which portions of the shared image need to be refreshed for each participant. This consumes valuable server processing as well as necessitating multiple requests and responses between each of the participants' devices and the server to track state information of each shared image. Moreover, mapping applications that share large images where streaming video is not available necessitates updates to images and portions of images for multiple participants across various interfaces. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments may be generally directed to desktop and/or screen sharing systems. Some embodiments may be particularly directed to techniques to provide updates to an image being shared during screen or desktop sharing sessions where only portions of the screen being updated are sent to a participant based on generation versions. A source sends an image to be shared among participants of the session to a server. The server divides the image into a plurality of tiles based on the size of the image, compression parameters, etc., where each tile corresponds to a portion of the shared image. When a portion of the image is updated, the source sends the tiles corresponding to those updated portions to the server. When a participant requests an update of the image during the sharing session, the client device associated with the participant sends a request to the server for any updates. This request also includes the current generation of the image the participant is viewing. The server compares the current generation of the image being viewed by the participant to the generation of each of the tiles and sends updated tiles when the tiles stored on the server have a generation value greater than the generation of the image being viewed by the participant. In this manner, when an image is updated/revised, only those tiles corresponding to portions of the image that were updated/revised may be sent to a session participant instead of sending the entire image after every update which unnecessarily consumes available bandwidth and processing time.

In one embodiment, for example, an apparatus may comprise a logic device, a remote sharing module and an image generation module. The remote sharing module is operative on the logic device to share an image with one or more client devices. The image may be divided into a plurality of tiles each corresponding to a portion of the shared image. The image generation module is operative on the logic device to determine a version of each of the plurality of tiles and compares the version of each of the plurality of tiles with a received client version of the same image.

In another embodiment, a computer-implemented method may comprise receiving a plurality of tiles where each tile represents a portion of an image to be shared. A server generation version is assigned to each tile associated with a version of the corresponding portion of the image. A client generation version is also received that is associated with the same image as viewed by a client device. The client generation version is compared to the server generation version for each tile and a portion of the image corresponding to one or more of the tiles for which the server generation version is greater than the client generation version may be sent to the client device to provide a client device with a current version of the shared image. Other embodiments are described and claimed.

BRIEF DESCRIPTION OF THE DRAWINGS

FIG. 6A illustrates an embodiment of a logic flow.

FIG. 6B illustrates an embodiment of a logic flow.

FIG. 6C illustrates an embodiment of a logic flow.

DETAILED DESCRIPTION

Figure 1:
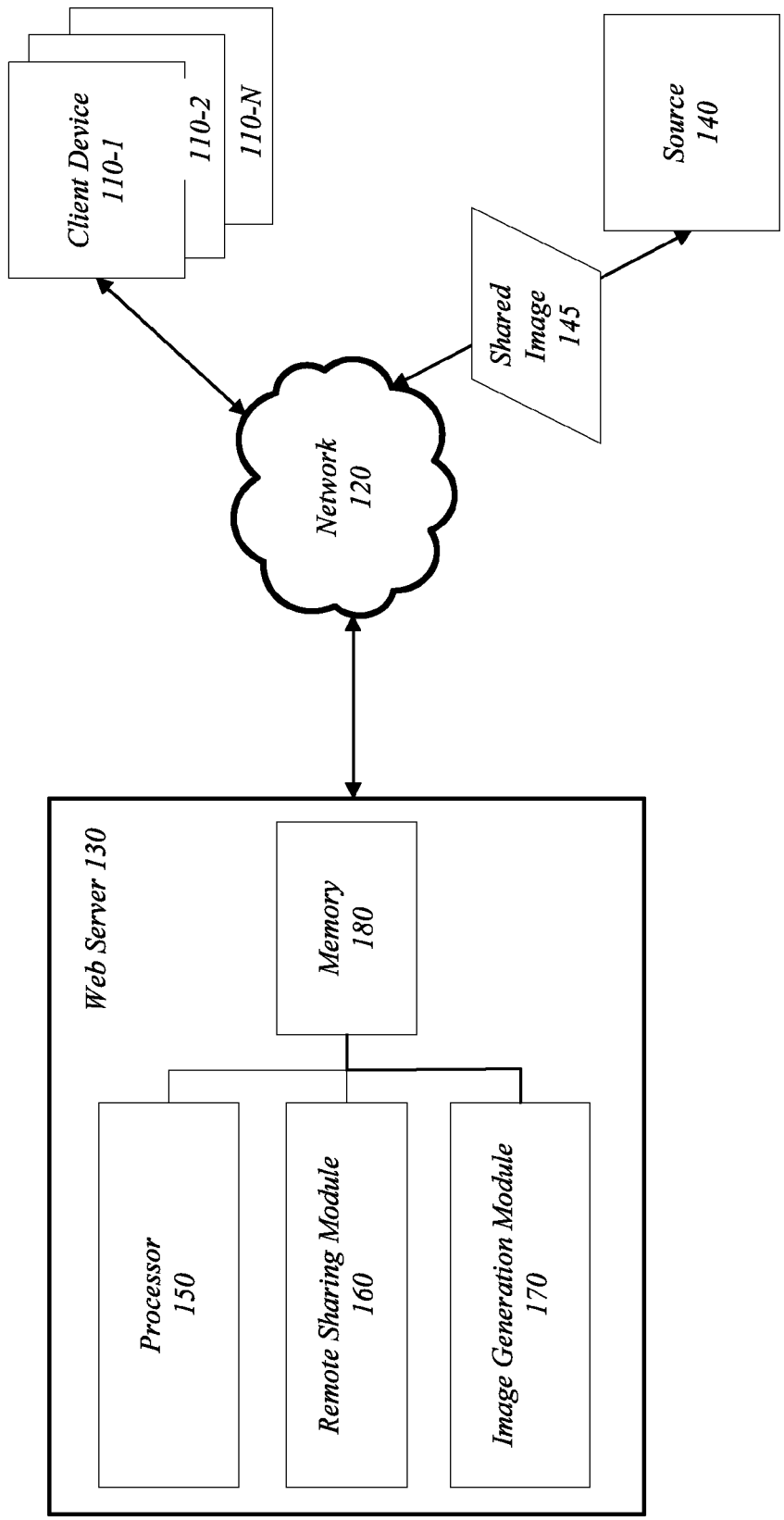
FIG. 1 illustrates an embodiment of an image sharing system.

In a typical image sharing environment, large amounts of image data may be shared between a source of the image and one or more participants. The source sends an image to a server which the server divides into a plurality of tiles where each tile corresponds to a portion of the image to be shared. When a portion of the image is updated, the source sends the tiles corresponding to those updated portions to the server. Alternatively, a participant may be the source of the image in which case the server and the source may be logically the same and the image(s) are shared peer to peer. A participant may request the server to update the image by sending a request to the server which includes the current generation of the image the participant is viewing. The server compares the current generation of the image being viewed by the participant to the generation of each of the tiles and sends updated tiles when the tiles stored on the server have a generation value greater than the generation of the image being viewed by the participant. Thus, when an image is updated/revised only those tiles corresponding to portions of the image that were updated/revised may be sent to a session participant instead of sending the entire image after every update which unnecessarily consumes available bandwidth and processing time.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art. Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram of a system 100 for desktop sharing between a source 140 and various client devices 110-1 . . . 110-N over network 120. System 100 may represent a general system architecture suitable for implementing various embodiments. System 100 includes a plurality of client devices 110-1 . . . 110-N where "N" is a positive integer. It is worthy to note that the use of "N" for different devices or components of the multimedia conference system 100 does not necessarily imply a same number of different devices or components. Source 140 and client devices 110-1 . . . 110-N communicate with web server 130 via network 120. Source 140 is configured to send an image 145 to be shared with client devices 110-1 . . . 110-N to web server 130. Generally, the image 145 may be part of a desktop screen sharing arrangement or other remote image sharing session managed by web server 130.

Web server 130 may include one or more processors 150, remote sharing module 160, image generation module 170 and memory 180. The system 100 may be arranged to communicate, manage and/or process different types of information, such as image 145 and control information among source 140 and client devices 110-1 . . . 110-N during a remote image sharing session. Examples of image 145 supplied by source 140 may be a scraping or copying of a monitor. It should be understood that web server 130 and source 140 may be the same component where image 145 is supplied by web server 130. In addition, although the web server 130 is shown and described as a single server environment this has been done for ease of explanation. In addition, web server 130 may be implemented as one or more servers, a server farm and/or distributed server architecture. For instance, web server 130 may represent a first server that manages the generation and transmission of shared image 145 using remote sharing module 160 and a separate server that communicates with the server 130 that runs and manages image generation module 170 to process requests from client devices 110-1 . . . 110-N for updated versions of image 145 as described in more detail below.

Source 140 may connect to web server 130 and request the server to create a session in order to share image 145, for example, among client devices 110-1 . . . 110-N. This session may be initiated using an HTTP GET command. The remote sharing module 160 on server 130 establishes the requested session and returns a session-specific identifier to source 140 via an HTTP POST or HTTP GET command. This session specific identifier may provide a means for identifying a particular session for source 140 for which client devices 110-1 . . . 110-N may join since web server 130 may support a plurality of sessions for a number of different users. Source 140 may utilize a codec to send encoded screen image 145 and differential encoded screen image updates to server 130. Generally, a codec is a device or computer program capable of encoding and/or decoding a digital data stream or signal for transmission, storage or encryption, and/or decodes it for playback. The client devices 110-1 . . . 110-N may use AJAX (Asynchronous JavaScript and XML) calls to retrieve decoded image 145 from web server 130 once source 140 sends the encoded screen image to the server. Alternatively, the image may be updated based on a predefined update period and/or may be controlled by the server based on requests from one or more participants. This update period may depend on bandwidth constraints, server availability, etc.

The client devices 110-1 . . . 110-N may comprise any logical or physical entity that is arranged to view the screen sharing session managed by web server 130. The client devices 110-1 . . . 110-N may be implemented as any device that includes, in its most basic form, a processing system including a processor and memory, one or more multimedia input/output (I/O) components, and a wireless and/or wired network connection to communicate with network 120. The multimedia I/O components are configured to provide the image received from server 130 via network 120 which are processed by the client devices 110-1 . . . 110-N. Examples of such client devices 110-1 . . . 110-N may include without limitation a personal computer (PC), mobile device, a personal digital assistant, a mobile computing device, a smart phone, a computer, a desktop computer, a laptop computer, a notebook computer, a handheld computer, a tablet computer, a server, a work station, a mini-computer, a distributed computing system, a multiprocessor system, a processor-based system, a gaming device, consumer electronics, a television, a digital television, combinations thereof, and/or web renderings of the foregoing. In some implementations, the client devices 110-1 . . . 110-N may be implemented using a general or specific computing architecture similar to the computing architecture described herein with reference to FIG. 7.

Remote sharing module 160 communicates with processor 150, memory 180 and image version module 170 to manage and control the screen sharing session among and between source 140 and each of the client devices 110-1 . . . 110-N. In particular, remote sharing module 160 may utilize SIP (Session Initiation Protocol) for controlling the communication session between each of source 140, client devices 110-1 . . . 110-N and server 130 regardless of the type of underlying transport layer used to send and receive image 145 via network 120. In addition, remote sharing module 160 manages desktop or image sharing from source 140 and client devices 110-1 . . . 110-N via network 120 over HTTP (Hypertext Transfer Protocol) or HTTPS (Hypertext Transfer Protocol Secure). As referred to herein, whenever the term HTTP is used it should be understood to include HTTPS. Likewise, whenever the term HTTPS is used it should be understood to include HTTP. Although network 120 is illustrated as a single network, it should be understood that network 120 may comprise any number of separate and/or interconnected networks as described in more detail with reference to FIG. 8.

Source 140 may send image 145 to server 130. Image 145 may be a copy of a monitor used by source 140 where the source image and the monitor image is the same. The image may be divided into a plurality of tiles where each tile represents a portion of the image 145. For example, the monitor from which the image is shared may have 1280×1024 pixels and the image may be divided into a 20×16 matrix of 64×64 tiles. Each tile includes a number of pixels where each pixel has an associated color in order to display respective portions of image 145. There is a trade-off related to image compression and tile size where compression is not as effective on images using smaller tiles versus larger tiles since larger tiles change more often since they comprise more pixels. Of course, various decoding techniques as well as the size of the tile matrix may be dependent on the type of image and/or monitor utilized, bandwidth constraints, network topology, etc. The embodiments are not limited in this respect.

Figure 2:
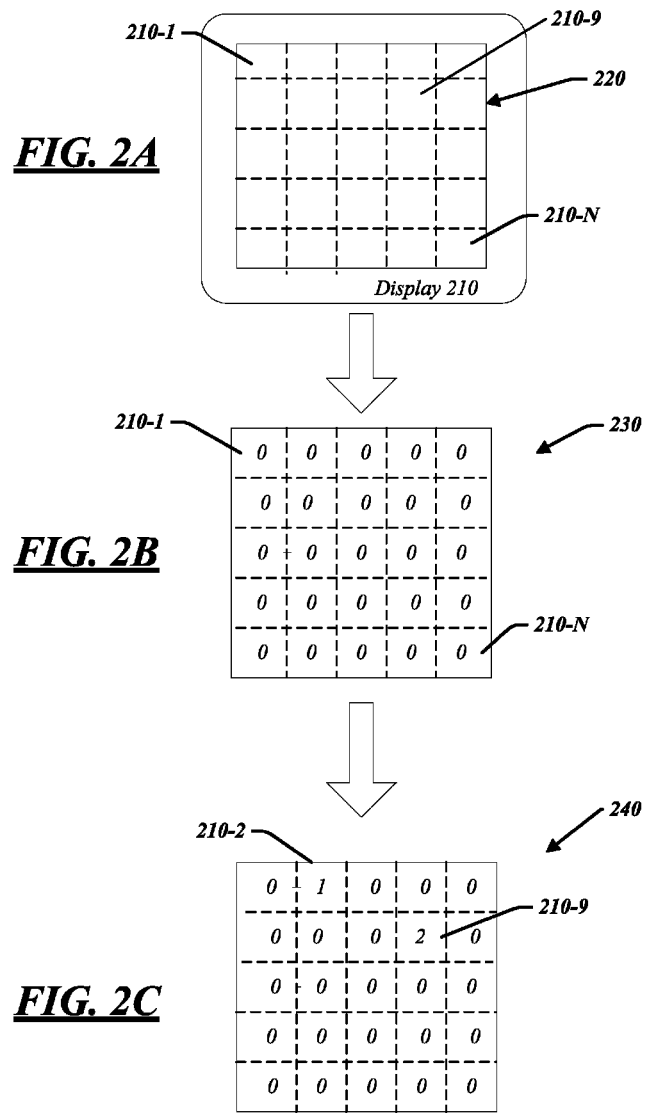
FIG. 2A illustrates a block diagram of a monitor or display associated with the image sharing system.
FIG. 2B illustrates an exemplary tile matrix.
FIG. 2C illustrates an exemplary tile matrix.

FIG. 2A illustrates a block diagram of an exemplary monitor or display 210 associated with source 140 displaying image 145. The display area 220 of display 210 is divided into a plurality of tiles 220-1 ... 220-N. In this example, display area 220 is divided into 25 tiles in a 5×5 matrix for ease of explanation. However, display area 220 may be associated with a large monitor having 1920×1200 pixels, for example, which may be divided into hundreds or thousands of tiles each having a plurality of pixels in a matrix arrangement where each tile displays a portion of image 145. As mentioned above, when a screen sharing session is initiated, source 140 sends image 145 to server 130 where each tile 220-1 ... 220-N contains a portion of image 145. The image data for each tile 220-1 ... 220-N is encoded and sent to server 130 for rendering via a web page that may be accessed by client devices 110-1 ... 110-N. In previous systems, server 130 would maintain the state of each tile by client device. In other words, server 130 would previously be required to track and store which client devices 110-1 ... 110-N were viewing which versions of tiles 220-1 ... 220-N and use that information to determine which client devices should receive updates to which tiles when the image was updated or otherwise changed. The systems and methods described herein obviate the need for the server 130 to track the tile state for each client device during an image sharing session as described in more detail below.

FIG. 2B illustrates an exemplary tile matrix 230 having a number of cells corresponding to the number of tiles 210-1 ... 210-N shown in FIG. 2A. The matrix 230 is maintained by server 130 based on the version of each tile 210-1 ... 210-N that comprises image 145 received from source 140. The matrix 230 includes an integer value corresponding to the version of respective tiles 210-1 ... 210-N associated with image 145. When server 130 first receives image 145, the generation matrix 230 is set to all zeros. For example, tile 210-1 has a corresponding generation which is set to zero. Similarly, tile 210-N has a corresponding generation which is also set to zero. Each tile 210-1 ... 210-N may be referred to herein consistent with a matrix addressing x, y nomenclature. For example, tile {1, 4} refers to row one (x=1) and the fourth tile in row one (y=4). Similarly, tile {4, 3} refers to row 4 (x=4) and the third tile in that row (y=3). The server 130 and more particularly image version module 170 maintains the matrix 230 of integer values based on updates received from source 130 to the individual tiles 210-1 ... 210-N of display area 220.

FIG. 2C illustrates an exemplary tile matrix 240 where certain cells having integers corresponding to versions of portions of image 145 corresponding to tiles 220-1 ... 220-N of display area 220 have been updated. As noted above, each tile 210-1 ... 210-N corresponds to a particular area on display 220. When one or more tiles 210-1 ... 210-N are updated, the corresponding version is incremented to an integer that corresponds to the latest version of the tiles. For example, tile 210-2 having address {1, 2} includes the integer one (1) which means that the portion of image 145 corresponding to tile 210-2 has been updated as compared to the version of all the other tiles (210-1 ... 210-N) and/or changed as compared to the same tile shown in FIG. 2B which had version zero ("0"). Similarly, tile 230-9 having address {2, 4} includes integer two (2) which means that the portion of image 145 corresponding to tile 210-9 was updated by incrementing the latest version of any of the tiles (e.g. tile 210-2) by one (1) making the current portion of the image the latest version for that particular tile. To further clarify this example, if the portion of the image 145 corresponding to tile 210-2 has been updated it receives integer 1. When the portion of the image 145 corresponding to tile 210-9 is updated, it receives integer two (2) since the updated version of tile 210-9 corresponds to the latest version of the all the tiles (e.g. version 1 of tile 210-2) incremented by 1. Thus, if the portion of the image corresponding to tile 210-2 is updated again, it will not receive integer 2, but rather integer 3 since the latest version of all the tiles is represented by integer two (2) of tile 210-9.

When a portion of image 145 corresponding to a tile is updated by source 140, the source sends the updated tile(s) to server 130 and the corresponding version of that tile on the tile matrix 240 is incremented to indicate that an update has been received for the corresponding tile. When server 130 receives the updated tile(s) corresponding to an updated portion of image 145, server 130 stores the updated image in memory 180. For example, when source 140 updates tile 210-2, source 140 sends the portion of the image associated with tile 210-2 to server 130 which stores the portion of the image (e.g. 145) in memory 180. Similarly, when source 140 updates tile 210-9, source 140 sends the portion of the image associated with tile 210-9 to server 130 which stores the portion of the image in memory 180. Each time source 140 updates one or more tiles 210-1 ... 210-N associated with image 145 during a sharing session, server 130 stores the updated portions of the image in memory 180 and updates the corresponding cell for the one or more tiles with the next generation integer. The generation of the tiles 210-1 ... 210-N as identified in the tile matrix 240 does not have to be unique. For example, if source 140 updates the tiles 210-1 ... 210-9 after initialization, then each of the versions of tiles 210-1 ... 210-9 will each be incremented by 1 in the tile matrix 240. However, if a tile 210-1 is updated more often than tile 210-9, then the version of tile 210-1 in tile matrix 240 will be greater than the version of tile 210-9. In addition, image generation module 170 keeps track of the various versions of each tile 210-1 ... 210-N that comprises the image 145 using tile matrix 240. Thus, in order to render a current image to each of the client devices 110-1 ... 110-N, the portion of the image having the most current generation version as denoted in the tile matrix 240 may be supplied to each client device as described in more detail below. In this manner, image generation module 170 only maintains the state or version of image 145 for each tile 210-1 ... 210-N based on updates received by server 130. Server 130 does not maintain individual states or versions of tiles 210-1 ... 210-N for each client device 110-1 ... 110-N. In other words, the version of each of the tiles 210-1 ... 210-N that comprises image 145 is maintained by server 130 regardless of what version a particular client device may be viewing.

Figure 3:
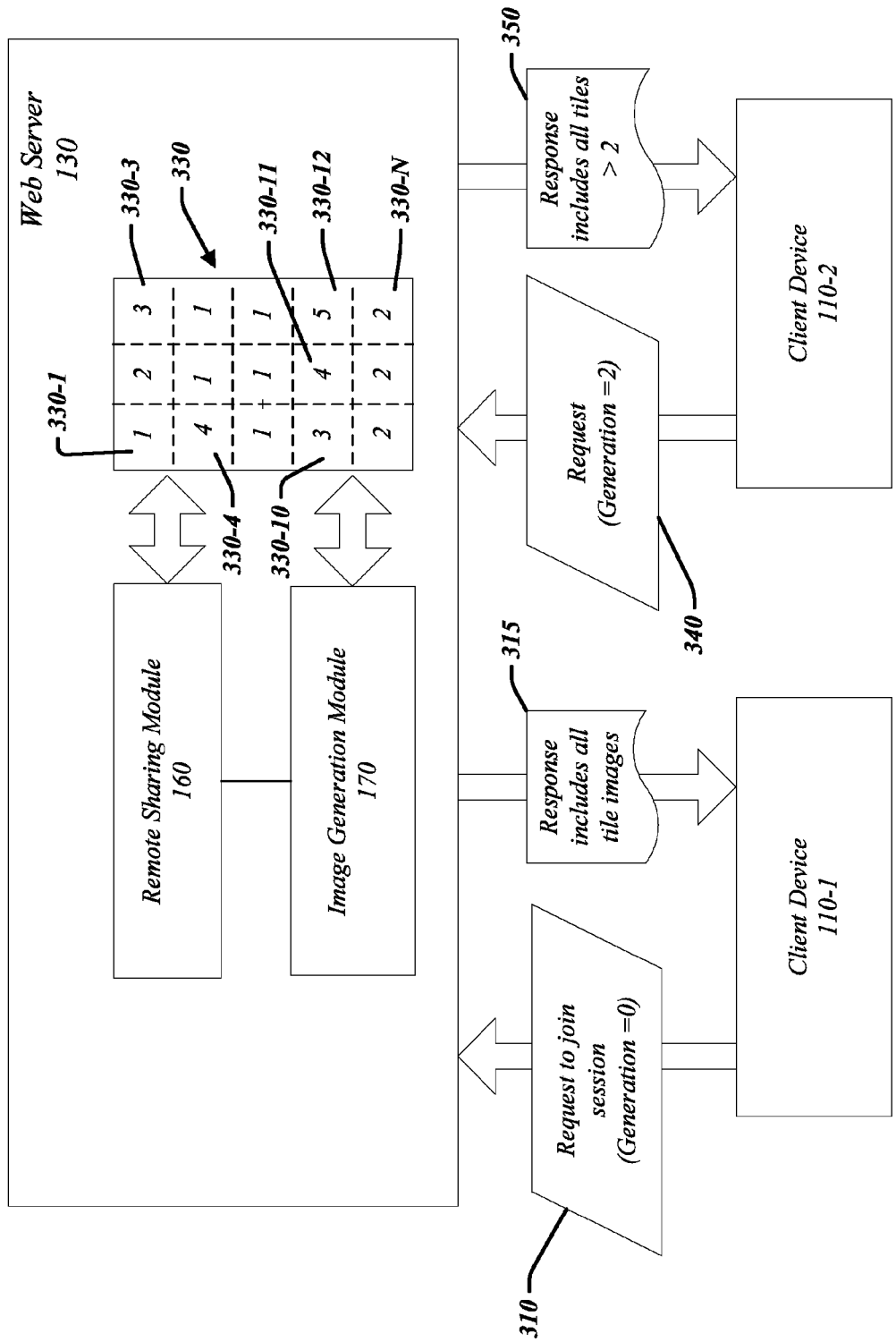
FIG. 3 illustrates an exemplary functional block diagram of an image sharing system.

FIG. 3 illustrates an exemplary communication session between client devices 110-1, 110-2 and web server 130. Client device 110-1 sends a request 310, for example an HTTP GET or POST command, to web server 130 to join the screen sharing session initiated by source 140 (shown in FIG. 1). Included in request 310 is client generation information. In particular, each client 110-1 . . . 110-N keeps a local generation version to track the last generation of images it has received corresponding to tiles 330-1 . . . 330-N for a particular image being shared. The generation information associated with a particular client device 110-1 . . . 110-N may be an integer. For example, when a client device 110-1 initially joins a session, the generation for client device 110-1 is zero (0). This generation information is included as part of the request 310. Each client 110-1 . . . 110-N maintains its own generation information. In other words, when a client requests an image or images from web server 130, the request includes the particular client's last generation information of that image. Other than the generation information provided by a client device (e.g. 110-1) in request 310, the server 130 does not maintain generation information on a client by client basis for a shared image.

Remote sharing module 160 receives the generation information from client device 110-1 and sends a command to image generation module 170 to determine if the client generation version is less than the generation maintained by web server 130. Image generation module 170 maintains tile matrix 330 associated with a particular sharing session. Image generation module compares the received client generation version to each of the versions of tiles 330-1 . . . 330-N and determines if the client generation version is less than any of the versions of tiles 330-1 . . . 330-N. Again, the tile matrix 330 indicates the version of each tile that comprises an image being shared between a source (e.g. 140) and client devices 110-1 and 110-2, for example. If the client generation version is less than the integer value representing any of the versions of tiles 330-1 . . . 330-N from matrix 330, then a control directive is sent from image generation module 170 to remote sharing module 160 to send the portions of the images associated with those tiles 330-1 . . . 330-N, stored in memory 180, having a generation that is greater than the client generation version. Remote sharing module 160 sends client device 110-1 portions of the image corresponding to the tiles 330-1 . . . 330-N which has a generation version that is greater than the client's generation. In this instance, since the request from client device 110-1 is to join the session, the client generation version=0. Image generation module 170 compares this client generation version (0) to the generation version of each of tiles 330-1 . . . 330-N that comprise the image. Since all of the generation values for tiles 330-1 . . . 330-N are greater than the client generation version, each of the portions of the image associated with tiles 330-1 . . . 330-N are sent by remote sharing module 160 to client device 110-1 via response 315. In addition, server 130 includes in response 315 the latest generation that the server received from source 140 so that the next time client device 110-1 requests image updates, image generation module 170 may compare the image generation version received from client device 110-1 and provide portions of the image corresponding to tiles 330-1 . . . 330-N that are greater than the image generation version. In other words, response 315 includes all portions of the image associated with tiles 330-1 . . . 330-N where the client generation version is less than the generation version for tiles 330-1 . . . 330-N that comprise the shared image (e.g. 140).

Client device 110-2 may also send a request 340, for example an HTTP GET or POST command, to web server 130 to retrieve updates to the shared image (e.g. 145). Client device 110-2 may submit a "hanging get" HTTP request which, in this case, is a request for updated images which the server 130 retains for client device 110-2 until updates are available. The client device 110-2 may also include, in request 340 or in a separate request, to resize the image in which case, server 130 may resize the image according to any of the processes described with reference to FIGS. 6A-6C herein. The frequency of request commands from client device 110-2 (or any client device 110-1 . . . 110-N) is based on the bandwidth available for the client device to receive updated image data as well as other criteria such as, for example, image update period or rate, server load, etc. As part of request 340, client device 110-2 includes its last known image generation version. This obviates the need for the web server 130 to maintain state information for each client 110-1 . . . 110-N since each update request (e.g. 310) received from a client device (e.g. 110-1) includes the client generation version. In the example shown in FIG. 3, the last generation version that client device 110-2 has seen of the shared image is "2". Remote sharing module 160 receives this generation version information from client device 110-1 and sends a command to image generation module 170 to determine if the client generation version is less than the any of the tile generations maintained by web server 130. Again, matrix 330 has a plurality of cells each of which is populated with an integer value corresponding to the version of respective tiles 330-1 . . . 330-N associated with portions of an image being shared (e.g. 145). Image generation module compares the client generation version to each of the versions of tiles 330-1 . . . 330-N represented by integer values in matrix 330 and determines if the client generation version is less than any of the tile generations. In particular, the tiles satisfying the formula Tg>Cg are sent from web server 130 to client device 110-2 where Tg refers to the generation of a particular tile 330-1 . . . 330-N and Cg refers to the client generation received with request 340 from client device 110-2. In this example, the client generation version is "2" which is less than the integer values in tile 330-3 having address {1, 3}, tile 330-4 having address {2, 1} and tiles 330-10 . . . 330-12 having addresses {4, 1}, {4, 2} and {4, 3} respectively. Based on this comparison, a control directive is sent from image generation module 170 to remote sharing module 160 to send the images from the tiles 330-3, 330-4 and 330-10 . . . 330-12, stored in memory 180, to client device 110-2. Remote sharing module 160 may encode the portions of the images corresponding to tiles 330-3, 330-4 and 330-10 . . . 330-12 into a suitable format to send to client device 110-2. In this manner, only a single request and response communication protocol is required between a client device 110-1 . . . 110-N to obtain updated tile images. This reduces image latency problems since all tiles having a tile generation value greater than the client generation value are sent to a client device upon request.

Figure 4:
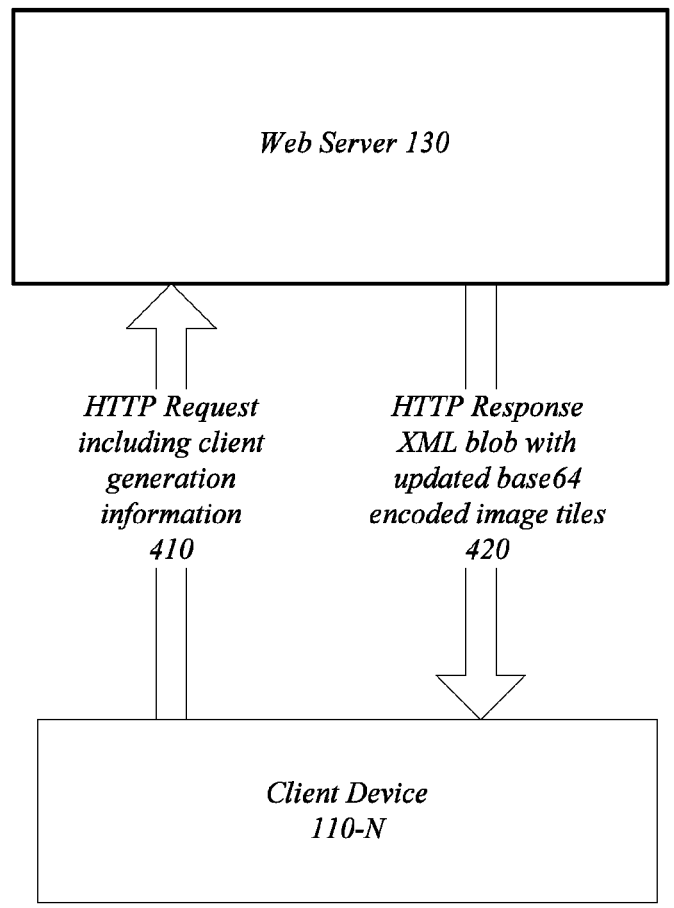
FIG. 4 illustrates an exemplary protocol.

FIG. 4 illustrates an exemplary protocol to send tiles representing portions of images between a client device 110-N and web server 130. Client device 110-N may be a web client which views an image saved on web server 130 during a sharing session using a typical web browser. Client device 110-N may also be a mobile device that views an image saved on web server 130 using a mobile application or browser. Client device 110-N may periodically send an HTTP request 410 to web server 130 to retrieve updated tiles representing portions of the images (e.g. 145) to be shared during a session. As noted above, the HTTP request 410 may be a "hanging get" which is a request for updated images which the client device 110-N sends once and server 130 retains the request until image updates are available. Included in the request 410 is the image generation version for client 110-N. The web server 130 utilizing image generation module 170 compares the client generation version included in request 410 to each of the versions of tiles and determines if the client generation version is less than any of the tile generations saved on the server 130. The image tiles saved on server 130 that match this criteria are encoded into a text file using, for example, base64 encoding and stored in formats such as an XML (Extensible Markup Language) blob or JSON (Javascript Object Notation). This text which contains the updated image tiles is sent back to client device 110-N as part of response 420. The browser used by client device 110-N to view the shared images must be able to support displaying base64 encoded images, for example. The embodiments are limited in this respect.

Depending on the size of a screen associated with a client device 110-N for which web server 130 sends the updated tiles as part of response 420, resizing or compression of the tile images may be necessary. For example, if client device 110-N is a mobile device, then the size of the screen from which the shared image originates (e.g. source 140) may be much larger than the size of the screen of the mobile device on which the updated image is to be displayed. For this reason, several resizing techniques may be used by server 130 and more particularly remote sharing module 160 when combined with the tile update embodiments described herein for an exemplary screen sharing session when the client device receiving image updates has limited bandwidth and/or screen size.

One resizing technique referred to as a "direct tile to tile resize" method converts each tile to a smaller size. For example, a source monitor having 1280×1024 pixel size may be divided into a matrix of 20×16 tiles where each tile includes 64×64 pixels. A direct tile to tile resize employed by server 130 may convert the 64×64 pixel tiles to 37×37 pixel tiles or any arbitrary pixel value. In this technique the size of each tile is reduced (i.e. number of pixels), but the number of tiles does not change. This allows arbitrary compression to any size tile. However, this technique negatively impacts available image size A second resizing technique is referred to as a "combine and cut" method where all the updated tiles are first combined to form a resultant image. The resultant image is resized to be smaller and this resized image is then divided into an arbitrary number of tiles each having the same pixel size. For example, a source monitor having 1280×1024 pixel size may be divided into a matrix of 20×16 tiles where each tile includes 64×64 pixels. Using this "combine and cut method," the updated tiles are aggregated back into a 1280×1024 image. If the client device that is receiving this image only has an 800×640 pixel screen size, then the new image is reduced and may be divided into a matrix of 13×10 tiles where each tile has a 64×64 pixel size, for example. This allows significant image compression for the shared image, but it negatively impacts server CPU processing resources.

A third resizing technique is referred to as the "power of two" method. This involves resizing the updated image to be $½^N$ of the original image size. For example, a source monitor may have a 1280×1024 pixel size. The "power of two" method resizes this image to 960×540 which is 1280/2×1024/2; or 480×270 which is 960/2×540/2; or 240×135 which is 480/2×270/2, etc. Essentially, this technique involves the server 130 taking each updated tile, computing what the resized tile would be and combining the surrounding tiles. Thus, when the source screen is being resized in half where N=2, then 4 source tiles ($½^N=½^2$) becomes 1 updated tile. This technique has less impact on server CPU resources than the "combine and cut method" as well as having less impact on bandwidth availability as compared to the "direct tile to tile resize" method. Depending on the type of client device employed, bandwidth availability and CPU resource constraints, may determine which of the resizing techniques are employed with the tile update embodiments described herein.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 5:
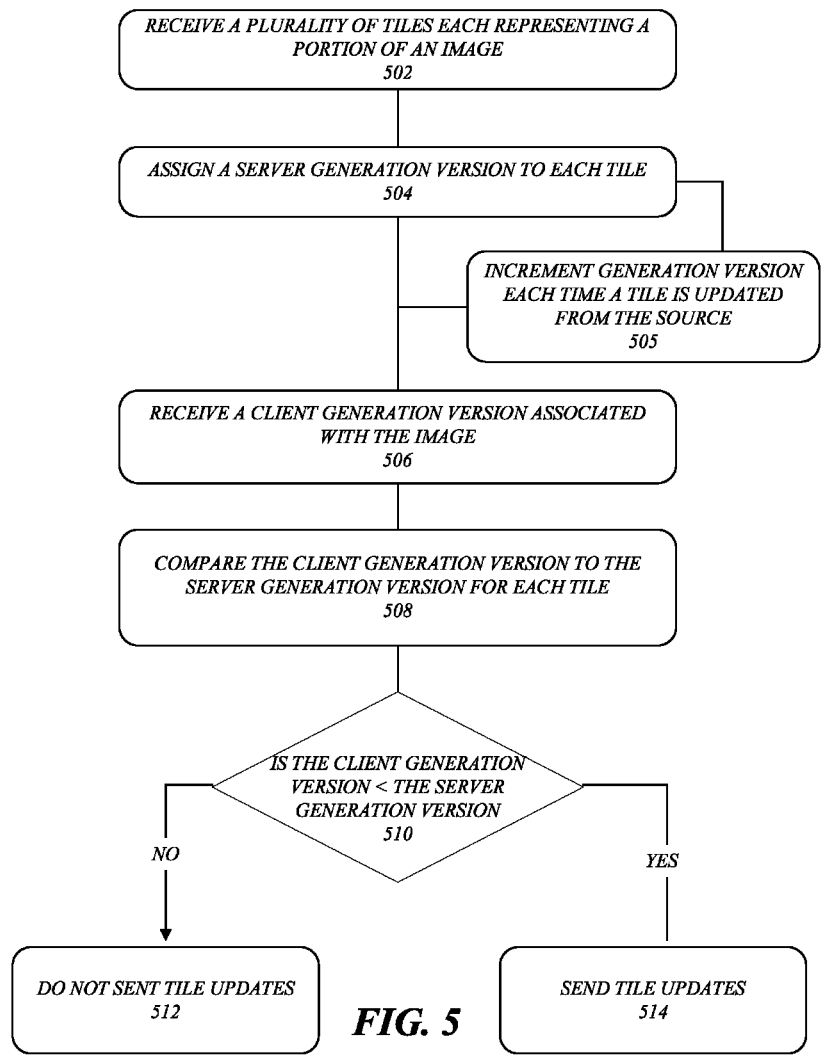
FIG. 5 illustrates an embodiment of a logic flow.

FIG. 5 illustrates one embodiment of a logic flow 500. Logic flow 500 may be representative of some or all of the operations executed by one or more embodiments described herein. As shown in FIG. 5, the logic flow 500 may receive a plurality of tiles each representing a portion of an image to be shared between a source and one or more client devices at block 502. For example, display area 220 of display 210 may be divided into a plurality of tiles 220-1 . . . 220-N where each tile displays a portion of image 145.

The logic flow 500 may assign a server generation version to each tile at block 504. For example, matrix 230 includes an integer value corresponding to the version of respective tiles 210-1 . . . 210-N associated with image 145. When server 130 first receives image 145, the generation matrix 230 is set to all zeros. When one or more tiles 210-1 . . . 210-N are updated, the corresponding version is incremented based on the latest version of all the tiles incremented by one. Each time a tile is updated, the generation version corresponding to the updated tile is incremented at block 505 based on the latest version of all the tiles that comprise image 145. As explained above with reference to the example shown in FIGS. 2A-2C, when a portion of the image 145 corresponding to a particular tile is updated, the version of that tile receives an integer incremented based on the latest version of the all the tiles that comprise the image.

The logic flow 500 may receive a client generation version associated with the image at block 506. For example, a client device 110-1 sends a request 310, for example an HTTP GET or POST command, to web server 130 to obtain an updated image during the sharing session. Included in this request 310 is client generation information associated with the image. The client generation information identifies the last version of images client 110-1 received corresponding to tiles 330-1 . . . 330-N for a particular image being shared.

The logic flow 500 compares the client generation version to the server generation version for each tile at block 508. For example, image generation module 170 compares the received client generation version to each of the versions of tiles 330-1 . . . 330-N. A determination is made at block 510 as to whether or not the client generation version is less than the server generation version. For example, image generation module 170 determines if the client generation version is less than the integer value representing any of the versions of tiles 330-1 . . . 330-N associated with the version of the tiles stored on server 130. This determination may be made on an aggregated basis where the server 130 may wait and aggregate the versions of tiles 330-1 . . . 330-N before generating an update.

If the client generation version is not less than any of the server generation versions, then no tile updates are sent to the client device by server 130 at block 512. If the client generation version is less than any of the server generation versions of the tiles, then tile updates are sent by server 130 to the client device at block 514. For example, remote sharing module 160 sends client device 110-1 portions of the image corresponding to the tiles 330-1 . . . 330-N which have a generation version that is greater than the client's generation.

FIG. 6A illustrates one embodiment of a logic flow 600. Logic flow 600 may be employed when source 140 has a relatively large screen size and updates to the shared image must be sent by server 130 to an exemplary client device 110-N which may be a mobile device having a significantly smaller screen size. As shown in FIG. 6A, the logic flow 600 receives a plurality of tiles each having a first total pixel size at block 602. For example, source 140 may utilize a monitor having a 1280×1024 pixel size that may be divided into a matrix of 20×16 tiles where each tile includes 64×64 pixels. At block 604, each received tile is resized to a second total pixel size where the second total pixel size<the first total pixel size. For example, each received tile is resized from having 64×64 pixels to 37×37 pixels or any arbitrary pixel value wherein the size of each tile is reduced (i.e. number of pixels), but the number of tiles does not change. In other words a pixel size may remain the same, but the number of pixels comprising the width and height of a tile may be modified.

FIG. 6B illustrates an embodiment of a logic flow 610 which is an alternative to the resizing technique described with reference to FIG. 6A. As shown in FIG. 6B, the logic flow 610 combines a first plurality of tiles representing the image to produce a revised image at block 602. For example, a source monitor having a 1280×1024 pixel size may be divided into a matrix of 20×16 tiles where each tile includes 64×64 pixels. The updated tiles are aggregated back into a 1280×1024 image. At block 614, the updated image is resized. The resized image may be then be divided into a second plurality of tiles where the second plurality of tiles<the first plurality of tiles at block 616 and the size of each particular tile may remain the same.

FIG. 6C illustrates an embodiment of a logic flow 620 which is an alternative to the resizing technique described with reference to FIGS. 6A and 6B. A plurality of tiles defining an original image size is received at block 622. For example, a source monitor may have a 1280×1024 pixel size. The plurality of tiles is resized using the formula $\frac{1}{2}^N$ where N is the proportion of the size of the resized image as compared to the original image at block 624. For example the server 130 takes each updated tile, computes what the resized tile would be and combines the surrounding tiles. Thus, when the source screen is being resized in half where N=2, then 4 source tiles ($\frac{1}{2}^N = \frac{1}{2}^2$) becomes 1 updated tile.

Figure 7:
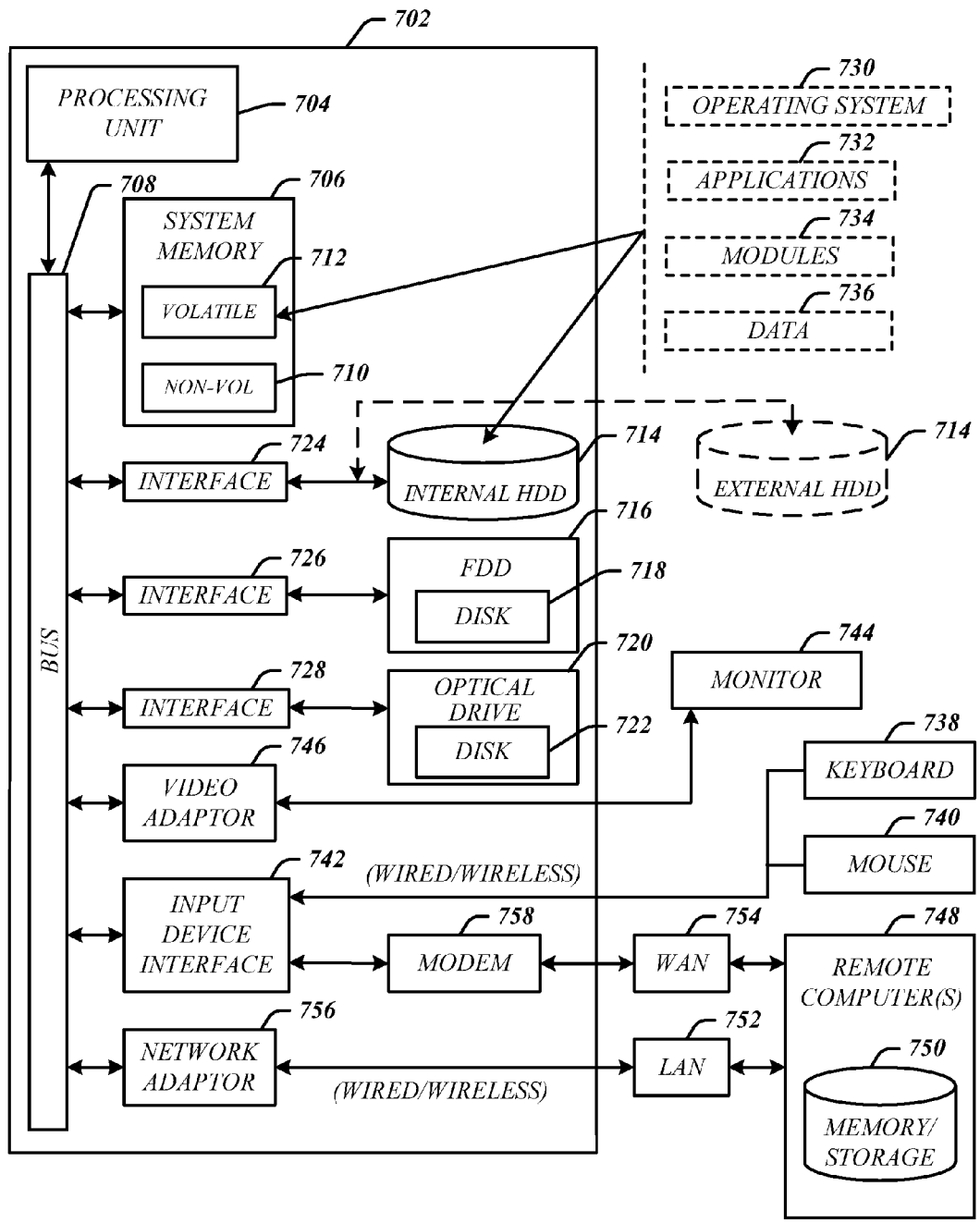
FIG. 7 illustrates an embodiment of a computing architecture.

FIG. 7 illustrates an embodiment of an exemplary computing architecture 700 suitable for implementing various embodiments as previously described. The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The system memory 706 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable storage media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. The one or more application programs 732, other program modules 734, and program data 736 can include, for example, remote sharing module 160, image version module 170, etc.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.7 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.7x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
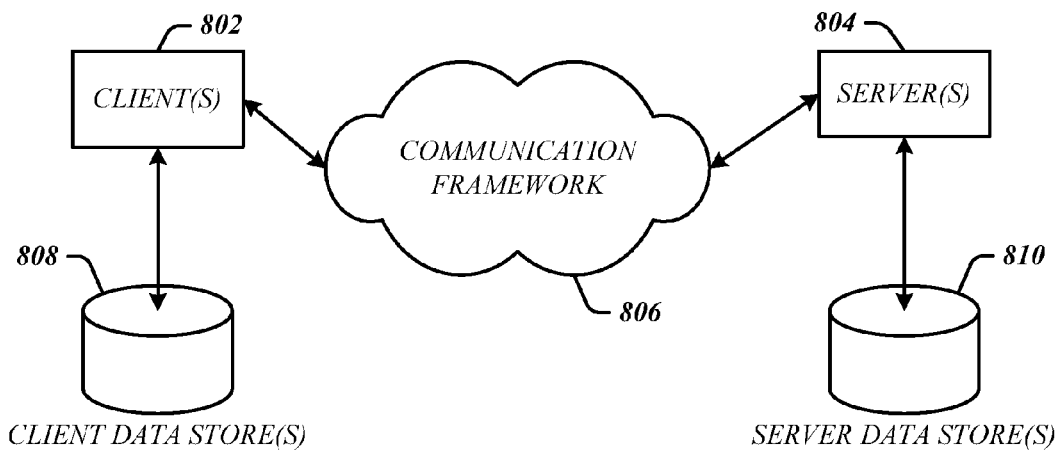
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 may implement the client device 130. The servers 804 may implement the server systems for web server 130. The clients 802 (which may represent clients 110-1 . . . 110-N) and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 802 and the servers 804 may include various types of standard communication elements designed to be interoperable with the communications framework 806, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 802 and a server 804 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus comprising:
a logic device;
a remote sharing module configured on the logic device to share an image of tiles received from a source with a plurality of clients, the image having a plurality of ties each corresponding to a portion of the image, and to receive a request from a client received from a source with a plurality of clients, the image having a plurality to provide a latest version of the plurality of tiles; and
an image generation module configured on the logic device to generate a version number of each of the plurality of tiles of the image from the source, each version number represents a latest generation version of the corresponding tile amongst all of the plurality of tiles, and compare the version number of each of the plurality of tiles of the image with a first client version number and a second client version number of a plurality of tiles of a same image that are received in the request from a first client and a second client of the plurality of clients, respectively, wherein the first client version number and the second client version number are different,
wherein the remote sharing module is configured to send one or more of the plurality of tiles having a version number that is greater than the first client version number to the first client and send one or more of the plurality of tiles having a version number that is greater than the second client version number to the second client,
wherein the remote sharing module is further configured to encode each of the portions of the image corresponding to the one or more of the plurality of tiles having a version number that is greater than the first client version number and each of the portions of the image corresponding to the one or more of the plurality of tiles having a version number that is greater than the second client version number, and transmit only the portions of the image corresponding to the one or more of the plurality of tiles having a version number that is greater than the first client version number to the first client and only the portions of the image corresponding to the one or more of the plurality of tiles having a version number that is greater than the second client version number to the second client.

2. The apparatus of claim 1 comprising a memory configured to receive the image from the remote sharing module and store the plurality of tiles each corresponding to the portion of the image.

3. The apparatus of claim 1 wherein the resizing is performed by converting each tile to a smaller size.

4. A computer-implemented method, comprising:
receiving a plurality of tiles from a source at a server, each tile representing a portion of an image;
assigning, at the server, a server generation version number to each tile associated with a latest version of that tile amongst all of the plurality of tiles after an update to the image;
receiving from a client, at the server, a client generation version number associated with each tile of the image;
comparing, at the server, the client generation version number to the server generation version number for each tile;

sending only the portion of the image corresponding to one or more of the tiles for which the server generation version number is greater than the client generation version number to the client;

receiving from another client, at the server, a different client generation version number associated with each tile of the image;

comparing, at the server, the different client generation version number to the server generation version number for each tile; and sending only the portion of the image corresponding to one or more of the tiles for which the server generation version number is greater than the different client generation version number to the other client.

5. The computer-implemented method of claim 4 further comprising receiving a request to update the image, the request including the client generation version of the image.

6. The computer-implemented method of claim 5 wherein the request is a hanging-get command.

7. The computer-implemented method of claim 4 further comprising encoding the portion of the image into a text format.

8. The computer-implemented method of claim 4 further comprising storing each tile representing the portion of the image.

9. The computer-implemented method of claim 4 further comprising receiving an updated tile representing an updated portion of the image.

10. The computer-implemented method of claim 4 further comprising assigning an integer value to each tile to represent the server generation version number.

11. The computer-implemented method of claim 10 further comprising:

receiving an updated tile representing an updated portion of the image; and incrementing the integer value associated with the server generation version number corresponding to the updated tile with the latest version of any of the plurality of tiles.

12. The computer-implemented method of claim 4 wherein each of the received plurality of tiles has a first number of pixels, the method further comprising resizing each of the plurality of tiles to a second number of pixels wherein the second number of pixels is less than the first number of pixels.

13. The computer-implemented method of claim 4 further comprising:

selecting a group of the plurality of tiles;

resizing each of the tiles within the selected group of the plurality of tiles; and combining the resized tiles within the selected group of the plurality of tiles.

14. The method of claim 4 further comprising resizing the image by dividing the image into a second plurality of tiles, wherein each tile in the second plurality of tiles has the same number of pixels as each tile of the first plurality of tiles, and wherein the second plurality of tiles is lesser in number than the first plurality of tiles.

15. At least one computer-readable storage drive or memory unit comprising instructions that, when executed, cause a system to:

receive a plurality of tiles at a server from a source, each tile representing a portion of an image;

assign, at the server, a server generation version number to each tile associated with a version of the corresponding portion of the image;

receive from a client of at least one client that is not the source a client generation version number of the image, the client having a display area smaller than the source, the server does not maintain client generation version numbers for the at least one client;

compare, at the server, the client generation version number to the server generation version number for each tile;

resize each tile for which the server generation version is greater than the client generation version to the client;

send only the portion of the image corresponding to one or more of the resized tiles for which the server generation version is greater than the client generation version to the client;

receive, at the server, an updated tile representing an updated portion of the image; and increment the server generation version number corresponding to the updated tile based on a latest version of all of the plurality of tiles;

receive from another client of the at least one client a different client generation version number corresponding to the portion of the same image;

send only the updated portion of the image corresponding to the updated tile to the at least one client.

16. The at least one computer-readable storage drive or memory unit of claim 15 further comprising instructions that when executed cause a system to:

assign an integer value for each tile to represent the server generation version number of the corresponding portion of the image;

receive an updated tile representing an updated portion of the image;

increment the integer value associated with the server generation version number corresponding to the updated tile.

17. The at least one computer-readable storage drive or memory unit of claim 15 wherein the resizing is performed by resizing each tile by a factor of ½.

* * * * *